United States Patent
Wirdel

(10) Patent No.: US 7,180,205 B2
(45) Date of Patent: Feb. 20, 2007

(54) DUAL-VOLTAGE VEHICLE ELECTRIC SYSTEM

(75) Inventor: Heinz Wirdel, Kerzenheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/544,530

(22) PCT Filed: Jan. 16, 2004

(86) PCT No.: PCT/EP2004/000287

§ 371 (c)(1),
(2), (4) Date: Aug. 29, 2005

(87) PCT Pub. No.: WO2004/069600

PCT Pub. Date: Aug. 19, 2004

(65) Prior Publication Data

US 2006/0110655 A1    May 25, 2006

(30) Foreign Application Priority Data

Feb. 5, 2003  (DE) .................... 103 04 764

(51) Int. Cl.
  *B60L 1/00*  (2006.01)
  *B60L 3/00*  (2006.01)
  *H02J 7/14*  (2006.01)
(52) U.S. Cl. ............ 307/10.1; 307/9.1; 320/123
(58) Field of Classification Search ............. 307/9.1, 307/10.1; 320/123
  See application file for complete search history.

(56) References Cited

U.S. PATENT DOCUMENTS 5,316,868 A    5/1994  Dougherty et al.

(Continued)

FOREIGN PATENT DOCUMENTS

DE    37 17 716 A1    10/1987

(Continued)

OTHER PUBLICATIONS

Kassakian, John G. et al., "Automotive Electronics Power Up", IEEE Spectrum, vol. 37, No. 5, May 2000, pp. 34-39.

(Continued)

*Primary Examiner*—Lynn Feild
*Assistant Examiner*—Michael Rutland-Wallis
(74) *Attorney, Agent, or Firm*—Norman N. Kunitz; Fitch, Even, Tabin & Flannery

(57) ABSTRACT

The present invention discloses a dual-voltage vehicle electric system in which a dual-battery vehicle electric system is integrated. In this dual-voltage vehicle electric system, two conventional vehicle batteries are used and are generally operated while connected in series. The series circuit provides the supply voltage for the vehicle electric system at a relatively high voltage for high-power loads. In order to implement an emergency start, both batteries, specifically a starter battery (BS) and a vehicle electric system battery (BB), are connected in parallel. In the case of a defective generator (G) or DC/DC converter (1), an emergency operating supply via battery is possible. The switching of a starter commutation device (U) which is arranged in the connection between the starter battery (BS) and the vehicle electric system battery (BB) is carried out by means of a control device (2) which receives input signals from sensing devices at the starter (S), generator (G), DC/DC converter (1), the starter battery (BS), the vehicle electric system battery (B) and an ignition switch (ZS) and a starter switch (SS) and correspondingly adapts the actuation.

8 Claims, 2 Drawing Sheets

U.S. PATENT DOCUMENTS

| | | | | |
|---|---|---|---|---|
| 6,275,001 | B1 * | 8/2001 | Dierker | 320/103 |
| 6,384,489 | B1 * | 5/2002 | Bluemel et al. | 307/10.1 |
| 6,731,021 | B1 * | 5/2004 | Urlass | 307/10.1 |
| 2002/0152981 | A1 | 10/2002 | Goetze et al. | |
| 2005/0253458 | A1 * | 11/2005 | Omae et al. | 307/10.1 |

FOREIGN PATENT DOCUMENTS

| | | |
|---|---|---|
| DE | 38 12 577 A1 | 10/1989 |
| DE | G 90 07 412.2 U1 | 8/1991 |
| DE | G 90 07 413.0 | 8/1991 |
| DE | 196 28 222 A1 | 1/1998 |
| DE | 196 45 944 A1 | 5/1998 |
| DE | 198 13 369 A1 | 9/1999 |
| DE | 100 55 531 A1 | 1/2002 |
| DE | 101 00 888 A1 | 7/2002 |
| DE | 102 08 981 A1 | 9/2002 |
| EP | 0 583 630 A1 | 2/1994 |
| EP | 1 245 452 A1 | 3/2001 |
| EP | 1 137 150 A2 | 9/2001 |
| JP | 05 155296 A | 6/1993 |

OTHER PUBLICATIONS

Patent Abstracts of Japan, vol. 017, No. 55 (—1492), Oct. 6, 1993.

* cited by examiner

DUAL-VOLTAGE VEHICLE ELECTRIC SYSTEM

CROSS REFERENCE TO RELATED APPLICATION

This application is the National Stage filing under 35 U.S.C. 371 of International Application No. PCT/EP2004/000287, filed Jan. 16, 2003, and claims priority of German Patent Application 103 04 764.6, filed Feb. 5, 2003, which is incorporated herein, in its entirety, by reference.

BACKGROUND OF THE INVENTION

The present invention relates to a dual-voltage vehicle electric system according to the preamble of patent claim 1.

The voltage supply in motor vehicles has conventionally usually been provided using a single battery which is charged by a generator. In modern motor vehicles having a multiplicity of electric loads one battery is in some cases no longer sufficient to supply voltage, for example to ensure starting, so that two separate batteries are used. In this context, one battery is generally assigned to the starter and the other to the rest of the vehicle electric system. For an emergency operating mode it is also possible to switch to the respective other battery in order to permit starting even when a battery is severely discharged.

For example, DE 198 13 369 A1 discloses a dual-battery vehicle electric system which has a circuit arrangement which is located between the two batteries, specifically a vehicle electric system battery or load battery and a starter battery, and can connect them to one another. If the load battery is discharged excessively, a relay opens a connection between the load battery and loads which are relevant to starting, and a semiconductor switch is switched in such a way that the entire voltage supply is drawn from the starter battery as an emergency operating mode for the loads which are relevant to starting.

Furthermore, DE 196 45 944 A1 discloses a vehicle electric system having at least two batteries which can be charged by a generator and which serve to supply various loads. A vehicle electric system control unit opens and closes a connection between the two batteries, one battery being provided predominantly for supplying the starter while the second serves to supply the other loads. If the voltage level of one of the two batteries drops below a predefinable value, an emergency operating mode can be implemented in which the starter battery can be charged from the other battery via a DC voltage converter to such an extent that restarting is ensured.

DE 196 28 222 A1 discloses the dual-battery vehicle electric system in a motor vehicle in which a vehicle electric system control unit is arranged between the batteries and one battery is predominantly used to supply power to the starter. The vehicle electric system control unit comprises a vehicle electric system module which carries out the necessary switching processes and has another terminal via which vehicle electric system components which are necessary for starting and for operation can be supplied with voltage. These vehicle electric system components are supplied with power with the highest priority, and are also supplied from the starting battery if the supply battery is excessively discharged, but in this case it is ensured that the other vehicle electric system components are not connected to the starting battery during the starting process.

DE 90 07 413 U1 also discloses a vehicle electric system which has a power supply component 11 with two batteries B1, B2 which are connected in series and have the purpose of supplying power to loads v1 to Vn, and a switch device 21 having at least one relay-actuated switch 31 and one electronic switching control device 61. By comparison with a defined voltage limiting value when the first battery B1 drops below this voltage limiting value, the switching control device 61 controls, on the basis of the voltage potential fed to it from one battery or both batteries B1, B2, the switching of the loads V1 to Vn from the potential of the first battery B1 to the overall rest voltage potential of both batteries B1, B2 by correspondingly energizing one of the relays 71 which activates the switches 61. The design of this conventional vehicle electric system is shown in FIG. 2.

However, in such systems, switching over to the starter battery as an auxiliary battery occurs only when the voltage of the vehicle electric system battery drops below a voltage limiting value. In addition, just one operating voltage is available for the vehicle electric system. However, high performance loads which are to be used in the vehicle electric system in future will require a higher voltage level than the loads which are conventionally present in the vehicle electric system.

DE 38 12 577 A1 discloses, for example, a vehicle electric system for a motor vehicle in which the voltage supply is provided using two generators and two batteries which are connected in series. The rated voltage of the first generator or of the first battery is different from the rated voltage of the second generator or second battery, so that in total three different voltages can be tapped at the series circuit comprising the two batteries. By using the two generators it is possible to charge the two batteries to an optimum degree even when there is uneven loading on the vehicle electric system. In addition, by way of example, voltage-sensitive components, for example for the ignition and/or injection, are connected to one of the batteries, and the starter is connected to the other battery with the higher voltage, as a result of which a voltage dip during starting does not disrupt the voltage-sensitive components.

Furthermore, DE 102 08 981 A1 discloses a vehicle with two vehicle electric systems and two batteries with different voltage levels. In this context, each vehicle electric system has a battery assigned to it. Furthermore, two intelligent power distributors with a power management facility for the various loads are provided and they monitor the entire vehicle electric system, including the battery, and for the respective vehicle electric system they process the input current and output current and the state of charge of the two electric systems by means of the power management facility.

Finally, DE 101 00 888 A1 discloses a vehicle electric system which has at least two batteries which can be charged by a generator and which are used to supply power to a first load and a second load. One of a plurality of DC voltages can be optionally generated by means of a DC voltage converter. The respectively generated DC voltage is made available for charging the second battery.

However, these two dual-voltage vehicle electric systems always require at least two batteries with different voltages. For this reason, at least one battery with a voltage higher than in conventional vehicle batteries is necessary, and such a battery requires more installation space and entails higher costs.

The object of the present invention is to provide a dual-voltage vehicle electric system which can be constructed with cost-effective conventional components and which requires as little installation space as possible and at the same time has the increased availability of a dual-battery vehicle electric system and is capable of emergency starting and emergency operation.

SUMMARY OF THE INVENTION

This object is achieved according to the present invention by a dual-voltage vehicle electric system for a motor vehicle, having a starter that requires a first vehicle electric system voltage, a generator that generates a second vehicle electric system voltage that is higher than the first vehicle electric system voltage, a DC/DC converter, a starter battery, a vehicle electric system battery, a control device, an ignition switch and a starter switch that is closed when the starter is activated, where the starter and the generator are connected to a first terminal of the control device and first and the second actuation lines lead from the control device to the starter and generator, wherein: the starter battery and the vehicle electric system battery have identical rated voltages and are connected in series: a starter commutation device is arranged in the connection between the starter battery and the vehicle electric system battery: the vehicle electric system battery is connected by one terminal to ground and by the other terminal to a first terminal of the starter commutation device: the second terminal of the starter commutation device is connected to a terminal of the starter battery: the other terminal of the starter battery is also connected to the first terminal of the control device: the series circuit composed of the vehicle electric system battery, the starter commutation device and the starter battery is arranged in parallel with the starter or generator: the starter commutation device is connected to the control device via a third actuation line: the terminal of the vehicle electric system battery that is connected to the commutation device is also connected to a second terminal of the control device and to a first terminal of the DC/DC converter: the DC/DC converter is connected by a second terminal to the first terminal of the control device, while a third terminal of the DC/DC converter is connected to ground: and wherein the DC/DC converter is actuated via a fourth actuation line of the control device: and in addition the control device is connected to the ignition switch and to the starter switch via further actuation lines via which the control device receives information as to whether the ignition switch or the starter switch have been activated. Advantageous developments of the invention are specified in the subclaims.

In this way, a dual-voltage vehicle electric system and a dual-battery vehicle electric system can be produced in a way which is cost-effective and saves installation space using, for example, two conventional 12 V batteries. As a result, the advantages of the dual-voltage vehicle electric system can also be implemented simultaneously with those of the dual-battery vehicle electric system in a single vehicle electric system.

The dual-battery vehicle electric system significantly increases the availability of the vehicle when a battery fails. In addition, the two batteries can be optimized for their application. Furthermore, as a result of the simultaneous implementation of a dual-voltage vehicle electric system in the dual-battery vehicle electric system it is also possible to operate high performance loads. Moreover, the use of a bidirectional DC/DC converter permits power to be exchanged between the starter battery and the vehicle electric system battery and/or allows emergency starting to be carried out by parallel connection of the two batteries. In addition, a 14 V/28 V emergency operating supply is provided and possible by means of the battery when a generator is defective or a DC/DC converter is defective. Finally, the vehicle electric system voltage is stabilized during a starting process.

BRIEF DESCRIPTION OF THE DRAWINGS

This object and further objects, features and advantages of the present invention are apparent from the following description of a preferred exemplary embodiment in conjunction with the drawing.

DETAILED DESCRIPTION OF THE INVENTION

A preferred exemplary embodiment of a dual-voltage vehicle electric system according to the present invention will now be described in more detail.

However, firstly details will be briefly given on the core problem which is solved by the dual-voltage vehicle electric system according to the invention.

In order to operate comfort loads and/or large loads such as, for example, an air conditioning system, heating systems etc., which are required only in the driving mode, it is necessary for the vehicle electric system to supply 28 V, for example. Depending on the state of charge of the batteries and an activated DC/DC converter, operation in a stationary state is also possible, only in exceptional cases. However, only 14 V is applied to this distribution system during the starting process, as a result of which undervoltage protection is necessary or it is necessary to switch off the loads which are switched on.

On the other hand, it is necessary for the vehicle electric system to supply, for example, 14 V for all the continuous loads such as the lighting system, the radio, all the information electronics or I panel electronics and the engine.

Hitherto, consideration has been given to dual-voltage vehicle electric systems which provide at least two voltages of different levels but to do so require two batteries with different voltages. The need to use a battery with a significantly higher voltage than the conventional vehicle batteries increases the costs and the amount of space required.

This problem is solved by the dual-voltage vehicle electric system according to the invention, which uses two conventional vehicle batteries with the same voltage value and is simultaneously connected in such a way so as to ensure that an emergency operating mode is still possible even if there is a defect in one of the batteries.

The design and the operation of the dual-voltage vehicle electric system according to the invention will now be described in more detail using the example of a 14/28 V vehicle electric system and referring to FIG. 1.

Figure 1:
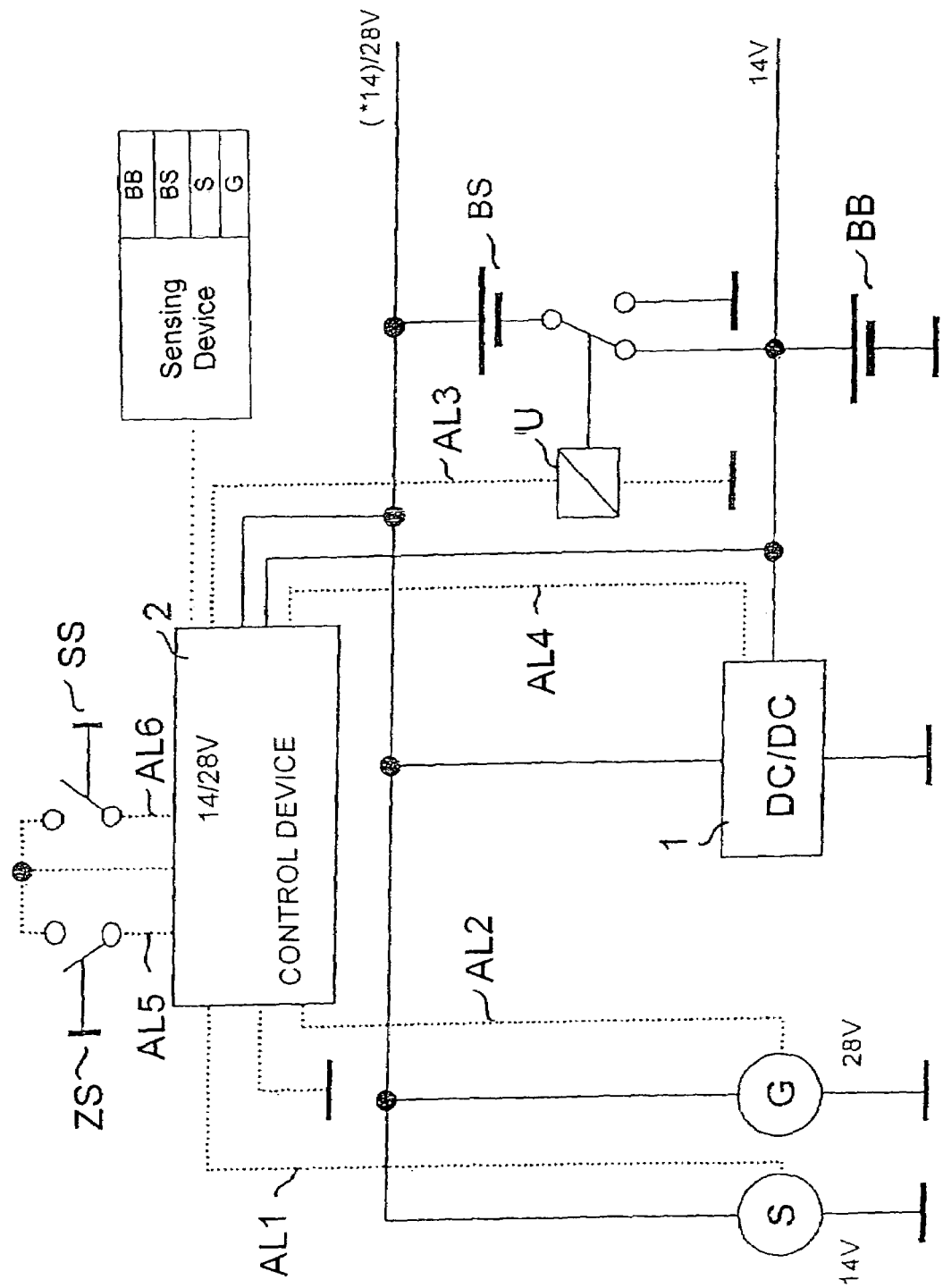
FIG. 1 is a block diagram of the 14 V/28 V vehicle electric system according to the invention.
Figure 2:
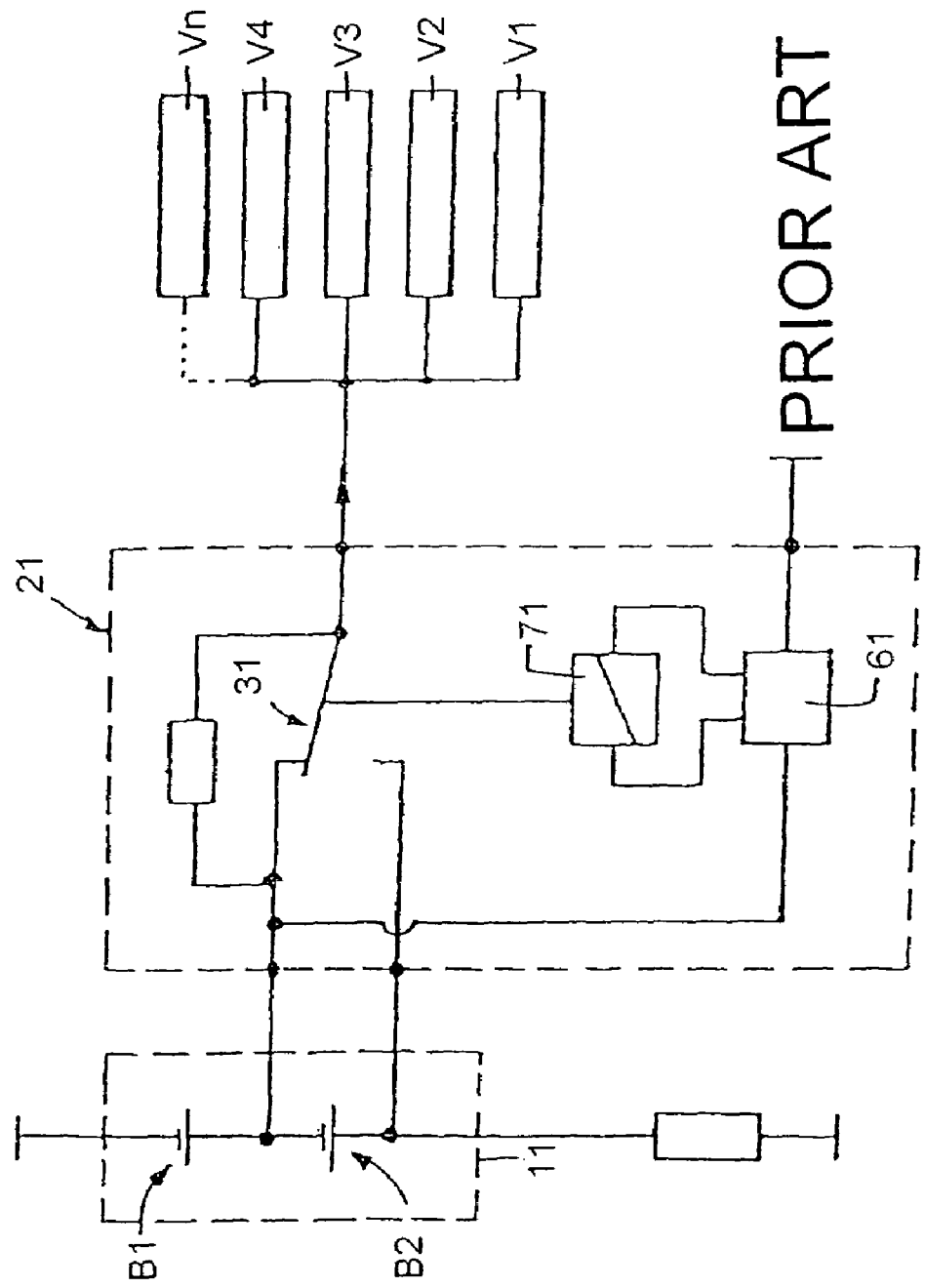
FIG. 2 is a block diagram of a conventional dual-battery vehicle electric system in which the two batteries are connected in series, as disclosed, for example, in DE 90 07 412 U1.

In FIG. 1, S designates a starter which requires a vehicle electric system voltage of, for example, 14 V, G designates a generator which generates a vehicle electric system voltage of 28 V, 1 designates a DC voltage/DC voltage or DC/DC converter, BS designates a starter battery, BB a vehicle electric system battery, U a starter commutation device, 2 a control device, ZS an ignition switch and SS a starter switch which is closed when the starter is actuated.

The starter S and the generator G are connected to a first terminal of the control device 2. In addition, first and second actuation lines AL1, AL2 lead from the control device 2 to the starter S and generator G. The vehicle electric system battery BB is connected by one of its terminals to ground and by the other terminal to a first terminal of the starter commutation device U. The second terminal of the starter commutation device U is connected to a terminal of the starter battery BS. The other terminal of the starter battery BS is also connected to the first terminal of the control device 2. This series circuit composed of the vehicle electric system battery BS, starter commutation device U and starter battery BS is arranged in parallel with the starter S or generator G. The starter commutation device U is connected via a third actuation line AL3 to the control device 2. The terminal of the vehicle electric system battery BB which is connected to the starter commutation device U is also connected to a second terminal of the control device 2 and to a first terminal of the DC/DC converter 1. This DC/DC converter 1 is connected by a second terminal to the first terminal of the control device 2, while a third terminal of the DC/DC converter 1 is connected to ground. The DC/DC converter 1 is actuated via a fourth actuation line AL4 of the control device 2. In addition, the control device 2 is connected to an ignition switch ZS and to a starter switch SS via further actuation lines AL5, AL6 via which the control device 2 receives information as to whether an ignition switch ZS or a starter switch SS has been activated.

The control device 2 of the dual-voltage vehicle electric system according to the invention receives, from sensing devices, input signals which supply information about the operating states of the batteries BB and BS and of the engine with the generator G. The control device 2 controls the DC/DC converter 1 and the commutation device U in accordance with these input signals.

The generator G has a battery sensing means and is configured for the charging process of the starter battery BS and of the vehicle electric system battery BB which is connected in series. The charge equalization for the starter battery BS is carried out via the 14 V vehicle electric system, and that for the vehicle electric system battery BB is carried out via the DC/DC converter 1.

The DC/DC converter 1 is a bidirectional DC/DC converter and thus permits power to be exchanged between the starter battery and the vehicle electric system battery BS, BB. The actuation by the control device 2 is configured in such a way that for an emergency start both batteries BS, BB can be connected in parallel. Likewise, when a defect is detected in the generator or in the DC/DC converter from the input signals from the sensing devices the starter commutation device U can be actuated by the control device 2 in such a way that an emergency operating supply is provided just via a battery.

The operation of the circuit shown in FIG. 1 will now be explained in more detail below.

When the ignition is switched off, i.e. the ignition switch ZS is open, the starter commutation device U is not actuated and the batteries BS and BB are connected in series. Quiescent current loads are then supplied with power from the vehicle electric system battery BB. In an exceptional case only, 24 V loads are also supplied with power by the vehicle electric system battery BB. However, depending on vehicle electric system battery BB. However, depending on the state of charge of the vehicle electric system battery BB and starter battery BS, charge equalization is also possible via the DC/DC converter.

The power supply for the control device 2 is generally provided by the vehicle electric system battery BB, but it is also possible by the starter battery BS.

If the ignition is switched on, i.e. the ignition switch ZS is closed, the voltage levels of the vehicle electric system and of the starter battery BB and BS are evaluated in the control device 2. Depending on the requirement, the DC/DC converter is immediately switched to the ready state in order to assist starting or is switched to the ready state only for a second starting attempt. If starting is performed via the starter switch SS, the starter commutation device U is firstly actuated by means of the control device 2 and the series circuit of the batteries BB and BS is opened, and if appropriate a starting aid is provided via the DC/DC converter 1. Via the supply line, the switching of the voltage from 28 V to 14 V is detected by the control device 2 and the starter S is activated via the actuation line AL1. After the starter switch SS is returned, i.e. switched off, or after the operation of the engine is detected via the actuation line AL2 (D+signal), the control device 2 no longer actuates the starter commutation device U, and the batteries BB and BS are connected in series. The vehicle electric system supply with 14 V and 28 V is available.

According to the invention, both voltages are thus available in the stationary state and in the driving mode with the exception of the starting process. The availability of the vehicle is increased by the separate vehicle electric system battery BB and starter battery BS, since when a battery fails the power for an emergency operating mode can be supplied by the other battery. In addition, the vehicle electric system according to the invention is cost-effective, since large-scale series manufactured components of the conventional 14 V vehicle electric system can be used. For this reason, in the preferred exemplary embodiment two conventional 12 V batteries are used as the vehicle electric system battery BB and starter battery BS. For large loads with relatively long feed lines a voltage of 28 V is available by virtue of the series connection of the vehicle electric system battery BB and the starter battery BS.

In summary, the present invention provides a dual-voltage vehicle electric system in which a dual-battery vehicle electric system is integrated. In this dual-voltage vehicle electric system, two conventional vehicle batteries are used and are generally operated while connected in series. The series circuit provides the supply voltage for the vehicle electric system at a relatively high voltage for high performance loads. In order to implement an emergency start, both batteries, specifically a starter battery BS and a vehicle electric system battery BB, are connected in parallel.

In the case of a defective generator G or DC/DC converter 1, an emergency operating supply via a battery is possible. The switching of a starter commutation device U, which is arranged in the connection between the starter battery BS and the vehicle electric system battery BB, is carried out by means of a control device 2 which receives input signals from sensing devices at the starter S, generator G, DC/DC converter 1, the starter battery BS, the vehicle electric system battery BB and an ignition switch ZS and a starter switch SS and correspondingly adapts the actuation.

The invention claimed is:

1. A dual-voltage vehicle electric system for a motor vehicle, having a starter (S) which requires a first vehicle electric system voltage, a generator (G) which generates a second vehicle electric system voltage which is higher than the first vehicle electric system voltage, a DC/DC converter (1), a starter battery (BS), a vehicle electric system battery (BB), a control device (2), an ignition switch (ZS) and a starter switch (SS) which is closed when the starter is activated, where the starter (S) and the generator (G) are connected to a first terminal of the control device (2) and first and the second actuation lines (AL1, AL2) lead from the control device 2 to the starter (S) and generator (G), wherein
- the starter battery (BS) and the vehicle electric system battery (BB) have identical rated voltages and are connected in series,
- a starter commutation device (U) is arranged in connection between the starter battery (BS) and the vehicle electric system battery (BB),
- the vehicle electric system battery (BB) is connected by one terminal to ground and by the other terminal to a first terminal of the starter commutation device (U),
- a second terminal of the starter commutation device (U) is connected to a terminal of the starter battery (BS),
- the other terminal of the starter battery (BS) is also connected to the first terminal of the control device (2),
- a series circuit composed of the vehicle electric system battery (BS), starter commutation device (U) and starter battery (BS) is arranged in parallel with the starter (S) or generator (G),
- the starter commutation device (U) is connected to the control device (2) via a third actuation line (A13),
- the terminal of the vehicle electric system battery (BB) which is connected to the commutation device (U) is also connected to a second terminal of the control device (2) and to a first terminal of the DC/DC converter (1),
- the DC/DC converter (1) is connected by a second terminal to the first terminal of the control device (2), while a third terminal of the DC/DC converter (1) is connected to ground, wherein the DC/DC converter (1) is actuated by means of a fourth actuation line (AL4) of the control device (2),
- and in addition the control device (2) is connected to the ignition switch (SZ) and to the starter switch (SS) via further actuation lines via which the control device (2) receives information as to whether the ignition switch (ZS) or a the starter switch (SS) have been activated.

2. The dual-voltage vehicle electric system as claimed in claim 1, wherein the control device (2) is connected to sensing devices which transmit operating states of the batteries (BB, BS) and of the starter (S) and of the generator (G) and actuates the commutation device (U) and the DC/DC converter (1) in response to the sensed operating states.

3. The dual-voltage vehicle electric system as claimed in claim 1, wherein the generator (G) can be used for a charging process of the starter battery and of the vehicle electric system battery (BS, BB) which is connected in series, where a charge equalization of the starter battery (BS) with the voltage level of the starter battery (BS) can be carried out via the vehicle electric system, and a charge equalization for the vehicle electric system battery (BS) takes place via the DC/DC converter (1).

4. The dual-voltage vehicle electric system as claimed in claim 1, wherein the control device (2) can switch to emergency operating supply via one of the batteries (BS, BB) in response to a "generator defective" signal or a DC/DC converter (1) "defective signal" by actuating the starter commutation device (U).

5. The dual-voltage vehicle electric system as claimed in claim 1, wherein the DC/DC converter (1) is bidirectional and an exchange of energy between the starter battery and the vehicle electric system battery (BS, BB) is thus possible.

6. The dual-voltage vehicle electric system as claimed in claim 1, in that wherein an emergency start can be implemented by parallel connection of the two batteries (BS, BB) by actuating the starter commutation device (U) by means of the control device (2).

7. The dual-voltage vehicle electric system as claimed in claim 1, wherein the dual-voltage vehicle electric system is a 14/28 V vehicle electric system in which the starter battery and the vehicle electric system battery (BS, BB) are each 12 V batteries.

8. The dual-voltage vehicle electric system as claimed in claim 2, wherein the generator (G) can be used for a charging process of the starter battery and of the vehicle electric system battery (BS, BB) which is connected in series, where a charge equalization of the starter battery (BS) with the voltage level of the starter battery (BS) can be carried out via the vehicle electric system, and a charge equalization for the vehicle electric system battery (BS) takes place via the DC/DC converter (1).

* * * * *